United States Patent Office 3,417,960
Patented Dec. 24, 1968

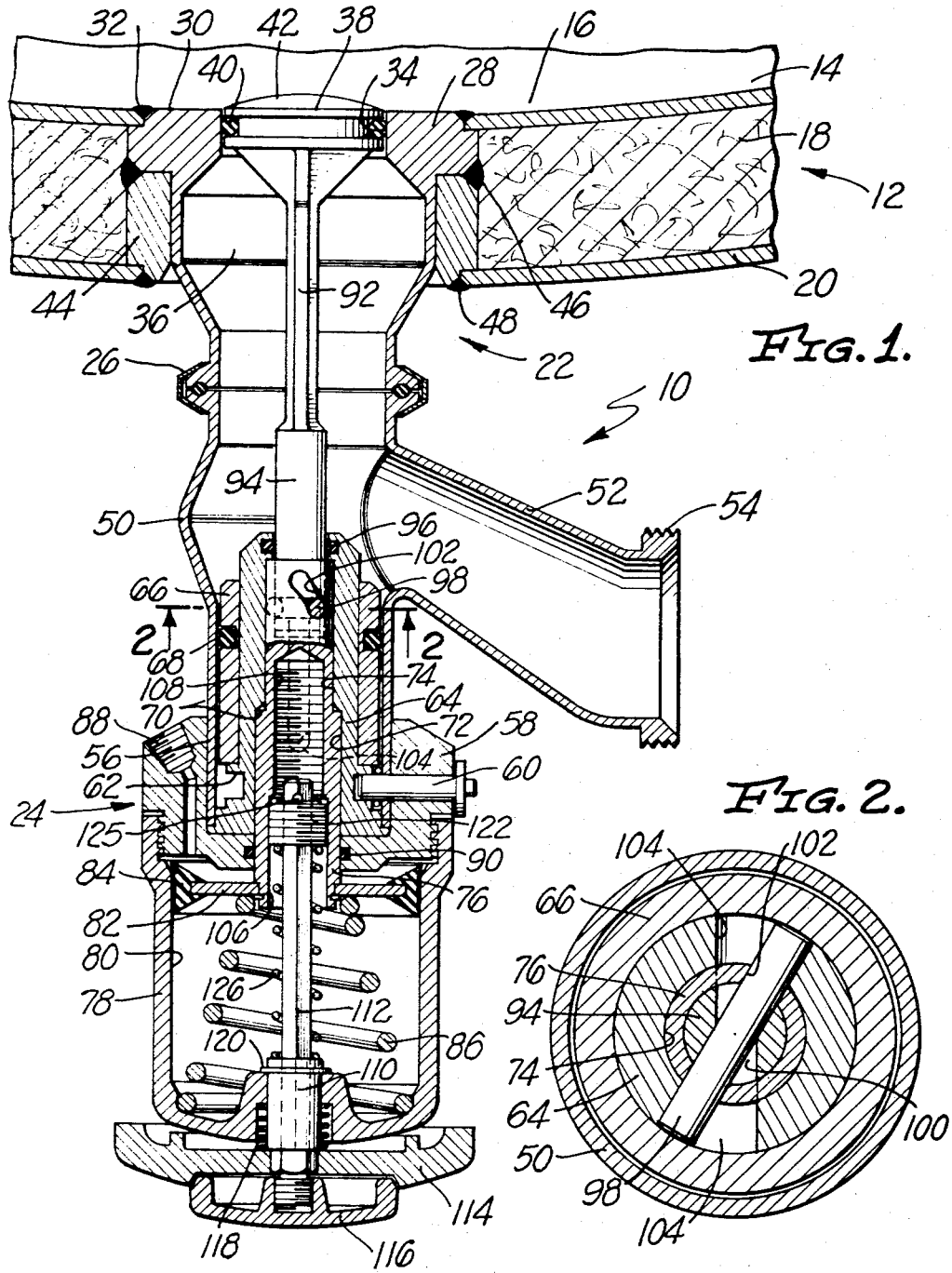

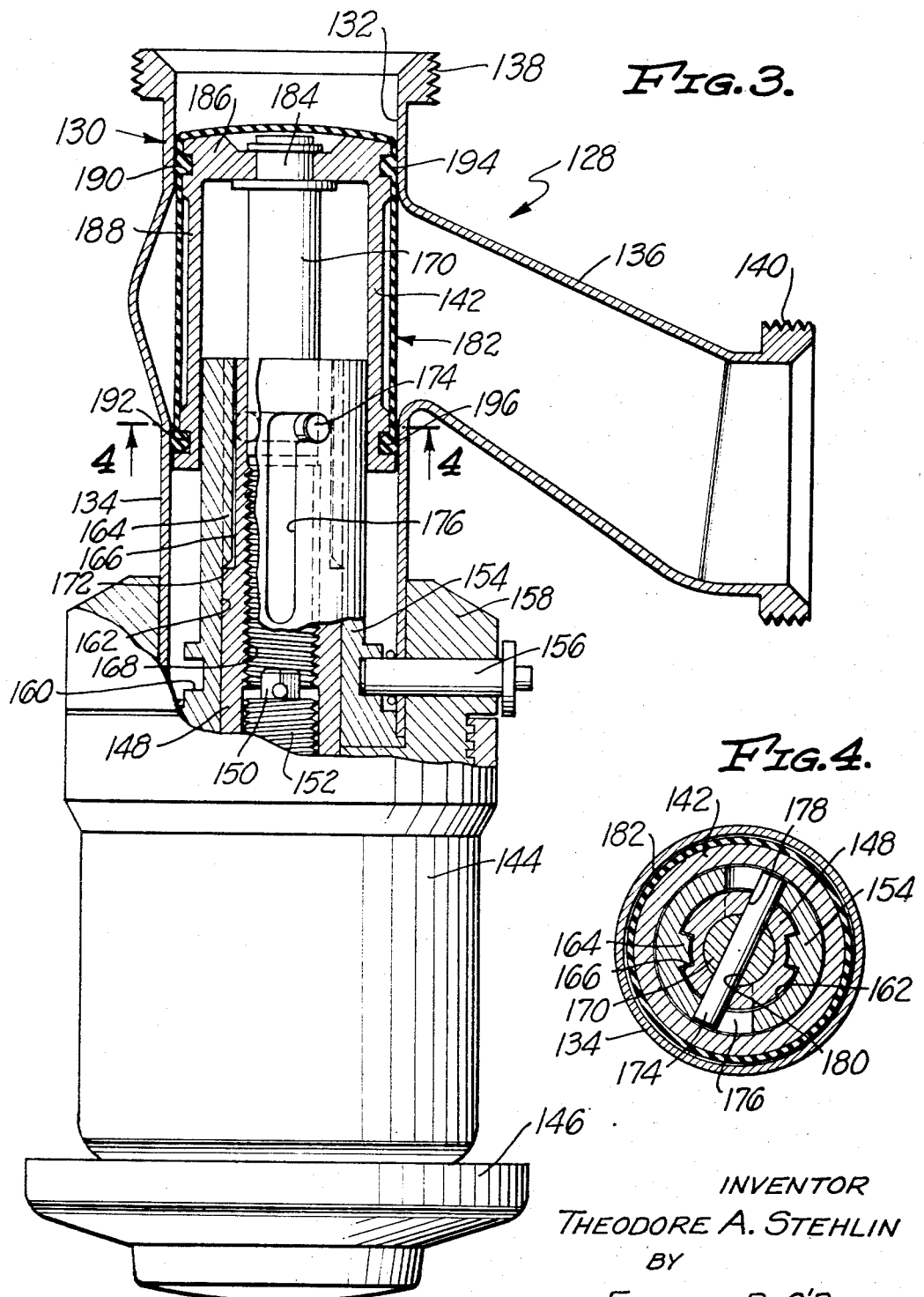

3,417,960
PISTON AND MANUAL OPERATED
RECIPROCATING VALVE
Theodore A. Stehlin, 54 Grace Walk,
Pasadena, Calif. 91105
Continuation-in-part of application Ser. No. 454,414,
May 10, 1965. This application June 15, 1967, Ser.
No. 646,346
9 Claims. (Cl. 251—14)

ABSTRACT OF THE DISCLOSURE

The valve operating part which moves a disc with respect to a seat is a dual purpose operator. It is primarily operable by means of a cylinder. The cylinder is spring urged in the valve closing direction. The piston rod is tubular with the valve stem passing into the tube. A pin passes through a helical slot in the piston rod and through the valve stem. The pin also extends into an L-shaped slot within the fixed portion of the valve operator so that when the valve is moved to the closed position the pin moves into the foot part of the L-shaped slot to lock the valve closed. In addition to piston actuation of the piston rod, a hand wheel is engageable so that interaction of screw threads causes motion of the piston rod upon rotation of the hand wheel.

CROSS REFERENCE

This application is a continuation-in-part of patent application Ser. No. 454,414, filed May 10, 1965, now Patent No. 3,370,827.

BACKGROUND

This invention is directed to a valve, and particularly a valve suitable for use in food processing equipment, dairy installation and other sanitary services. The valve comprises a kettle flange for positioning in a kettle which also serves as a seat member. The seat member is securable to the interior of the kettle and a spacer ring is securable to the seat member and to the kettle jacket. By this means the seat member and spacer ring completely seal with both the kettle lining and the kettle jacket to maintain the integrity of the insulation therebetween. A valve operator is secured to the seat member. This valve operator is designed for primary operation by fluid pressure and is provided with an auxiliary manual operator. Furthermore, the cylinder operates the valve stem through a locking pin interconnection so that when closed, the valve cannot be opened by forces upon the valve disc, but only by forces applied by cylinder operation or by manual operator operation. The same fail-safe mechanism which does not permit valve opening except by fluid actuation or hand wheel actuation is applicable to other styles of valves, and particularly the boot seal type of sanitary valve. Preferably, the valve is separable adjacent the seat member so that the valve operator can be removed from the kettle for kettle cleaning and line cleaning.

Quite a number of valves have been designed for the sanitary field, to limit the pockets in which material can be trapped, which pockets are difficult to clean. However, these prior art patents have not been suitably arranged for kettle use so that the valve disc itself presents a relatively flush face within the kettle to provide no unstirred pockets or uncleanable pockets in the kettle. Additionally, while fluid operation of sanitary valves is well known, the prior valves have been dependent upon maintenance of air pressure or the like and have not been self locking. Thus, they have not been fail safe and in some cases valves open when the air pressure fails to cause danger and mixing of materials when such mixing cannot be tolerated. The prior art has not been effective in solving the problems present in the sanitary valve field.

SUMMARY

The valve of this invention has a seat member with a cylindrical seat opening therethrough, which seat opening serves as a fluid passageway. The seat member is adapted to be secured into a kettle with its inner surface in general alignment with the inner surface or kettle. Furthermore, the valve disc, when in the closed position, moves into the seat opening to close that opennig, and thus close the valve. In this closed position the face of the valve disc lies in line with the face of the valve seat member and the interior of the kettle so that the interior of the kettle is fairly smooth to permit stirring of the kettle contents without the problems brought about by trapped pockets of material. The seat member is welded to the inner kettle lining and a spacer ring is secured to the seat member. The spacer ring is also secured to the kettle jacket so that the integrity of the insulation space between the kettle itself and its jacket is maintained where the valve is connected. Preferably, the valve operator is disconnectable from the seat member so that installation of the seat member is easily accomplished and the valve operator can be removed for repair, replacement and cleaning of the kettle, valve and lines. The valve operator is a fluid operated valve operator which has included therein an auxiliary manual operator. The auxiliary manual operator can be used for local control or can be used in the event of fluid pressure failure. Both the fluid pressure operator and the manual operator act through a sleeve, the sleeve is interconnected to the valve stem by means of a cross pin and the cross pin also moves in an L-shaped locking slot. The interaction is such that in the closed position the pin is in the locking portion of the L-shaped slot so that forces on the valve disc or valve stem cannot open the valve, even in the event of fluid pressure failure. The same fail-safe mechanism which does not permit valve opening except by fluid actuation or hand wheel actuation is applicable to other styles of valves, and particularly the boot seal type of sanitary valve.

It is thus an object of this invention to provide a valve which is particularly useful for sanitary installation which includes a valve seat member and valve disc which lie substantially in line with the interior of the vessel in which they are installed to eliminate trapped pockets. It is another object of this invention to provide a valve seat member which includes a spacer ring so that the valve seat member and spacer ring can be secured to both the kettle and to the kettle jacket to maintain the integrity of the insulation space therebetween. It is another object of this invention to provide a sanitary valve wherein the valve operator is disconnectable from the valve seat member so that the valve operator can be removed for cleaning of the vessel, the valve and the lines, as well as replacement and repair of the valve operator. It is a further object of this invention to provide a valve which is fluid operated and includes a fail-safe lock which locks the valve in the closed position so that forces on the valve seat cannot open the valve even upon fluid pressure failure. It is another object of this invention to provide a fluid operating structure which includes a fail safe lock which is applicable to virtually any type of valve structure having a rising stem. It is another object of this invention to provide a valve wherein the valve operator is alternatively fluid and manually operated. Other objects and advantages of this invention will become apparent from a study of the following portion of this specification, the claims and the attached drawings.

DESCRIPTION OF THE DRAWINGS

FIG. 1 is a longitudinal section taken through the preferred embodiment of the valve of this invention and through a portion of the kettle in which the valve is installed.

FIG. 2 is an enlarged section taken generally along the line 2—2 of FIG. 1.

FIG. 3 is a side elevational view, with parts broken away, showing the fail-safe valve operator of this invention applied to another style of valve.

FIG. 4 is a section taken generally along the line 4—4 of FIG. 3.

DESCRIPTION

The valve of this invention is generally indicated at 10, and the kettle in which it is installed is generally indicated at 12. The kettle 12 has an interior vessel 14 which defines the space in which material is to be stored, mixed, heated or otherwise acted upon. In view of the fact that the valve 10 is primarily useful for sanitary work, the kettle 12 is usually used for the containment of foodstuffs. Therefore, the interior surface of the vessel 14 is preferably without dead spaces or pockets, and such vessels commonly have cylindrical slides terminating in a hemispherical bottom. The portion of the vessel 14 which is shown is a portion of this hemispherical body. The vessel 14 has an interior surface 16. In some cases the kettle 12 is insulated, and such insulation is shown at 18. Jacket 20 is positioned around the exterior of insulation 18 to protect the insulation and to maintain the integrity of the insulation space.

In the customary sanitary practices, kettle 12 requires a bottom outlet for the discharge of materials therefrom. This outlet is provided by valve 10. Valve 10 has a valving portion 22 and a valve operating portion 24. These two portions are joined by the conventional three piece clamp type joint 26.

Valving portion 22 comprises seat member 28 which has a face 30. Seat member 28 is secured into an opening in the bottom of the vessel 14 by means of weld 32 or the like. It is secured with its face 30 generally in line with the interior surface 16 so that no pocket or dead space is formed. Seat member 28 is formed of relatively heavy material so that the welding at 32 can take place without substantial deformation of the seat member. Seat 34 is in the form of cylindrical surface which defines an opening from face 30 into the enlarged interior chamber 36 within the seat member. Valve disc 38 is positioned within the opening defined by seat 34 when it is in its closed position. Valve disc 38 has a conventional seal ring groove around its exterior and seal ring 40 is positioned therein. The valve disc and its seal ring groove, together with the seal ring are dimensioned in such a manner that when the valve disc is within the opening defined by the valve seat, the valve disc is sealed with respect to the valve seat and thus closes the opening. In the closed position shown, face 42 of the valve disc lies substantially in the same plane of the face 30 of the seat member to provide a relatively smooth bottom within the vessel 14. Thus, stirring or cleaning can take place without fear of trapped pockets of material caused by a dead space at the valve.

As is shown in FIG. 1, seat member 28 has a relatively heavy flange where the seat member is adjacent the vessel 14. Positioned around the seat member and adjacent this flange is spacer ring 44. Spacer ring 44 is welded to the kettle flange by weld 46. Weld 46 is preferably continuous in the circumferential direction so that a complete seal is obtained. The outer edge of spacer ring 44 is welded to an opening in jacket 20 by means of weld 48. Spacer ring 44 thus provides a jacket ring to which the jacket can be welded. Welding heat can be brought right up to the weld 48 without damaging the valve seat member 28 because the jacket ring is not directly connected to the thin walled portion of the seat member. Thus, the welding of the jacket 28 to the jacket ring 44 by means of weld 48 does not cause valve damage.

Thus, the kettle flange and spacer ring form a complete seat member which is sealed with respect to both the vessel and the jacket to completely close the opening in the vessel, the opening through the insulation and the opening through the jacket. Thus, the integrity of the insulation 18 is maintained and outside wash water and the like cannot get into the insulation space. Spacer ring 44 is preferably a separate element, permanently welded to the kettle flange. Because of this relationship, the spacer ring 44 can be left off when the vessel is not insulated and different axial lengths of spacer ring 44 can be selectively used for different circumstances relating to the thickness of the insulation or the total thickness of the kettle from the interior of the vessel to the exterior of the jacket. It is thus clear that the construction of valving portion 22 provides a sanitary valve which is so related to the kettle in which it is installed that no dead spaces or pockets are created by the valve, and which furthermore properly seals both with respect to the vessel and with respect to the jacket.

Referring now to the valve operating portion 24, it is connected to the valving part 22 by means of the triclamp joint 26 which is conventional in the sanitary arts. The clamp joint 26 aligns the parts and secures them together with reasonable accuracy. Sleeve 50 forms a portion of the fluid conducting structure and has a side outlet 52. Side outlet 52 is also tubular and its interior is in communication with the interior of tubular sleeve 50, and thus it is in communication through the clamp joint 26 to the chamber 36. Side outlet 52 is connectable by means of any conventional connection, such as threads 54 to a fluid pipe or the like.

The valve operating structure is mounted upon the cylindrical portion 56 of sleeve 50. Mounting member 58 is mounted on the end of the tubular portion of the sleeve and pin 60 extends through mounting member 58 and through a hole in the sleeve to retain the mounting member in place. Furthermore, pin 60 extends into circumferential groove 62 in guide 64. This retains both the mounting member and the guide in place. However, upon removal of pin 60, both can be pulled off of sleeve 50. Guide 64 is sealed with respect to the interior of the cylindrical portion of sleeve 50 by means of ring 66. Ring 66 carries ring seal 68 in a groove therein. Ring seal 68 is in engagement with the interior cylindrical surface of the cylindrical portion 56 of sleeve 50. Ring 66 extends forward in order to cover a portion of a slot in guide 64, which is later described.

Guide 64 has a bore therein. The bore is stepped so that shoulder 70 separates the larger cylindrical bore 72 from the smaller bore 74. Both of these are cylindrical and have a common axis through the center of the valve. Piston rod 76 has two cylindrical outer surfaces which correspond to the bores 72 and 74, and are in sliding fit with respect thereto. When the piston rod is in the upper, valve closed position shown, a shoulder on the piston rod engages the shoulder 70 to define this end position.

Cylinder 78 has an interior cylindrical bore 80 in which is positioned piston 82. Piston 82 is sealed with respect to bore 80 by means of piston ring 84. Piston 82 is secured to piston rod 76. Spring 86 is a compression spring and is engaged between the lower cylinder head and piston 82. Thus, both piston and piston rod are resiliently urged upward as is seen in FIG. 1. Fluid port 88 is connectable to any convenient source of fluid pressure, such as a source of air controlled by a three way valve. By this means fluid port 88 can be connected to a pressurized source of air, or to atmosphere. When pressurized, the air in fluid port 88 communicates through to the upper side of piston 82 and forces the piston downward against the force of spring 86. This of course brings piston rod 76 downward within guide 64. The piston rod is sealed by seal ring 90 so that fluid is prevented from leaking from the interior cylinder into the interior of sleeve 50.

Valve stem 92 is secured to valve disc 38 and is preferably an integral portion thereof. The central portion of the valve stem is prefearbly slender and resilient so that should misalignment occur between the valve operator and the valve seat, the valve disc can move into sealing position in it. The lower end of valve stem 92 forms cylindrical shaft 94. Cylindrical shaft 94 extends into the tubular open end of piston rod 76. The valve stem is sealed with respect to guide 64 by means of ring seal 96. Pin 98, see FIG. 2, extends through guide 64, piston rod 76 and the cylindrical portion 94 of valve stem 92.

Pin 98 serves as the interengagement and interconnection means between the piston rod and the valve stem so that motion of the piston rod causes motion of the valve stem. However, the interengagement of the pin with fixed guide 64 acts to lock the valve stem so that the valve cannot be opened by pressure upon the valve disc. This locking is accomplished by the surfaces in which the pin 98 fits within the three members through which it passes. Pin 98 passes through hole 100 which is transverse of the cylindrical portion 94 of the valve stem. Hole 100 can either be a simple cylindrical transverse hole, or can be a slot extending in the circumferential direction perpendicular to the axis through the valve stem. In the first case, valve disc 38 would rotate slightly when it reached its closed position. If this is objectionable, the short circumferential slot illustrated as hole 100 in FIG. 2 is used.

Slot 102 is a helical slot with a left hand helix, as is shown in FIG. 1. The angle about the axis through which the helical slot 102 extends is equal to the circumferential angle of hole 100. Finally, slot 104 is an L-shaped slot with its upright extending axially of the valve structure and its foot extending circumferentially at the upper end of the upright as shown in FIG. 1. The upright is substantially as long as the stroke of the piston and the foot of the L occupies substantially the same circumferential angle as hole 100 and helical slot 102 and L-shaped slot 104 are each symmetrical about the axis so that corresponding parts of the holes and slots are on the parts of these pieces on opposite sides of the axis.

As stated above, pin 98 passes through this hole and these slots. The effect is that when the piston rod moves from the lower, valve open position to the upper, valve closed position, pin 98 is in the upright of the L and in the corresponding parts of the helical slot and hole 100. When the valve disc reaches its closed position and the piston rod almost reaches the closed position, pin 98 bottoms out at the foot of the L-shaped slot. Further motion of the piston rod causes helical slot 102 to rotate the pin about the axis of the piston rod so that it rotates over into the foot portion of the L-shaped slot. In this position opening forces upon the valve disc act directly through the pin onto the foot portion of the L-shaped slot to prevent any opening forces from being passed onto the piston rod. The only way the valve can be opened is for the piston rod to move downward, as is seen in FIG. 1, with the consequent action of helical slot 102 rotating the pin out of the foot portion into the upright portion of L-shaped slot 104. Further motion of the piston rod then withdraws the valve disc from its seat into chamber 36 so that there is a flow passage from the interior of the kettle through side outlet 52.

In addition to the fluid actuating and locking operation of the valve, the piston rod 76 can also be manually actuated. The lower end of piston rod 77 is also tubular, with clearance hole 106 and threaded hole 108 entering the tubular piston rod from the lower end as is seen in FIG. 1. However, these holes do not intersect with the hole in the upper end of the piston rod in which the valve stem is positioned. The lower head of cylinder 78 has an opening therein which is rotatably positioned bushing 110. Square shaft 112 passes through bushing 110 and on the outer end of the shaft is located valve handle 114. Handle 114 is in the form of a hand wheel and is arranged for opening and closing the valve by means of manual rotation of the handle. Nut 116 holds handle 114 in place. Spring 118 is positioned between the head and handle 114 to urge the handle away from the head, and thus urge square shaft 112 in the downward direction. An end limit for this downward motion is provided by stop 120.

At the upper end of square shaft 112, and within clearance hole 106 is positioned screw 122 which is of such size as to threadedly engage the threaded hole 108. Pin 125 limits the upward motion of screw 122. Spring 126 urges the screw against pin 125. This structure is such that when the valve is open by air actuation, screw 122 simply slides down the square shaft 112. When the piston rod returns to the closed valve position shown, the screw simply returns upward under stress of its spring 126 to engage upon stop 125.

When manual actuation is desired, handle wheel 114 is pushed upward, compressing spring 118. The square shaft 112 and its pin 124 move upward and carry screw 122 upward to a point where it can engage within threads 108 upon rotation of the handle wheel. Since the opening through screw 122 is squared, to correspond to the square shaft 112, rotation of the hand wheel causes rotation of the screw. Thus, the threads engage and continued rotation of the hand wheel 114 draws piston rod 77 downward to cause the same action as when air actuated. Thus, the valve can be manually opened. Upon turning the hand wheel in the opposite direction, the screw 112 is unscrewed from the threaded hole and the spring 86 closes the valve until the final locking of pin 98 in the foot portion of the L-shaped slot 104. At this point screw 122 is released from the threaded hole and spring 18 returns the handle structure to the position shown. By either mode of operation, the valve disc locks into its closed position so that it cannot be opened by forces against the disc.

An additional embodiment of the valve of this invention is indicated in FIGS. 3 and 4 at 128. Valve 128 has a body 130 in which is formed a cylindrical valve seat 132. Body 130 includes a sleeve which has a cylindrical portion 134 and a side outlet 136. The body is arranged to be secured to adjacent equipment or pipelines by means of threads 138 and the associated joint on the end of the sleeve portion of the body and by threads 140 and the associated joint on the end of side outlet 136. Since valve 128 is particularly arranged for sanitary service and the like, the threads 138 and 140, together with their associated joining surfaces are preferably arranged to sanitary pipeline standards. Furthermore, if desired, instead of the threads 138, joining at that point can be by means of a clamp joint, such as shown at 26 in FIG. 1, together with a flange structure welded into a kettle such as is shown in the upper portion of FIG. 1.

Valve 128 has a valve disc 142 which is axially movable within body 130 to open connection between the entrance at valve seat 132 and side outlet 136. Cylinder 144 is mounted upon the cylindrical sleeve 134 to move the valve disc 142 between its open and closed position. Cylinder 144, and the structure contained therein, is identical to the cylinder 78 and the remaining parts of the valve operating portion 24, shown in FIG. 1. This also includes manual hand wheel 146 which corresponds to hand wheel 114, piston rod 148 which corresponds to piston rod 76, shaft 150 which corresponds to shaft 112, and screw 152 which corresponds to screw 122.

Guide 154 is mounted in the open end of sleeve 134 and is retained in position by means of pin 156 which passes through the cylinder mounting member 158, through an opening in the sleeve 134 and into circumferential groove 160 in guide 154. This structure detachably retains the parts together, but by withdrawal of pin 156 the cylinder and its mounting means together with the valve disc structure can be removed from the valve body. Guide 154 has a bore 162 therethrough in which is slidably positioned piston rod 148. As is seen in FIGS. 3 and 4, keys 164 are formed to extend interiorly from the bore 162 and keyways 166 are formed in the outer cylindrical surface of the piston rod to accept keys 164. These act as a spline connection which prevents relative rotation between guide 154 and piston rod 148.

Both the keys 164 and keyways 166 terminate in shoulders at 172 to limit the stroke of the piston rod 148 in the outward direction, upward in FIG. 3.

Piston rod 148 has an opening therethrough. One part of the opening contains threads 168 for engagement by screw 152 and the opening at the outer end of the piston rod is cylindrical to accept valve stem 170.

In similar manner to the valve 10, the piston rod, valve stem and guide are secured together to provide positive locking of the piston rod 170 in position. This is accomplished by pin 174 which passes through L-shaped slot 176 in guide 154, through helical slot 178 in piston rod 148 and is secured in the hole 180 in valve stem 170. In the valve closed position, pin 174 is in the foot of the L-shaped slot and resists any axial forces on the valve stem 70, because they are transmitted through pin 174 directly to the guide 154 which is secured to the valve body.

The helical slot 178 is arranged so that when piston rod 148 is retracted, the helical slot therein rotates valve stem 170 and moves the pin 174 into line with the axial portion of the L-shaped slot. During this portion of movement, the piston rod moves axially and the valve stem 170 merely rotates. However, when the pin reaches the axial portion of the slot, motion of the piston rod causes axial motion of the valve stem. By this motion, valve stem 170 moves valve disc 142 away from seat 132 and side outlet 136 so that there is a flow passage therebetween.

Valve disc 142 is of such configuration that it carries boot 182. Valve disc 142 is pivotally connected to valve stem 170 by means of rotary joint 184. Valve disc 142 has a head 186 and a skirt 188. The head and skirt are formed in unitary fashion. Head 186 carries seal groove 190 while skirt 188 carries seal groove 192. Boot 182 extends continuously over head 186 and skirt 188. Seal rings 194 and 196 are integrally formed in the boot and are positioned respectively in grooves 190 and 192. These seal rings respectively seal against seat 132 and the interior of sleeve 134. The structure of the valve disc 142 and boot 182 are shown in Stehlin Patent No. 3,062,496, granted Nov. 6, 1962. The disclosure of that patent is incorporated herein in its entirety. It is thus seen that valve 128 is also a fail-safe sanitary valve which can be operated both manually and by means of cylinder 144, and when in the closed position is locked against inadvertent opening by forces upon valve stem 170.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A valve, said valve comprising valving means and valve operating means:
    said valving means comprising a valve seat member having a valve seat therein and a valve disc movable into sealing engagement with said valve seat, the improvement comprising:
    a sleeve on said valve, said valve operating means being mounted on said sleeve, said valve operating means comprising a rod movable through said sleeve, said valve disc having a valve stem in said valving means, said valve stem extending into an opening in said rod, a helical slot in said rod, an L-shaped slot disposed in a fixed position relative to said valve seat, a pin, said pin extending into said L-shaped slot, into said helical slot and into said valve stem so that upon motion of said rod said pin moves in said L-shaped slot and said helical slot and causes motion of said valve stem with respect to the remainder of said valving means.

2. The valve of claim 1 wherein said rod defines an axis in said valve operating means and said L-shaped slot has an upright parallel to said axis and a foot at right angles to said axis so that during axial motion of said valve stem said pin is in said upright portion of said L-shaped slot.

3. The valve of claim 2 wherein a cylinder is secured to said sleeve and a piston is positioned within said cylinder, said rod being connected to said piston so as to form a piston rod, fluid connection means on said cylinder so that upon application of fluid under pressure to said fluid connection means said piston moves within said cylinder and said piston rod moves causing motion of said valve stem with respect to the remainder of said valving means.

4. The valve of claim 3 wherein a guide is positioned within said sleeve and said piston rod moves within said guide, said L-shaped slot being formed within said guide, said guide and said cylinder being removably secured to said sleeve.

5. The valve of claim 4 wherein said rod has a screw threaded opening therein, a handle rotatably mounted on said cylinder, said handle having a screw thereon so that upon engagement of said screw with said threaded opening and rotation of said hand wheel said rod is moved with respect to said sleeve.

6. The valve of claim 5 wherein said valving means comprises a valve seat member having a face, said valve seat member arranged to be welded into a vessel with its face lying substantially in line with the interior of the vessel, a cylindrical valve seat lying substantially axially through said valve seat member, a valve disc having a face, said valve stem being secured to said valve disc so that said face of said valve disc lies substantially in line with said face of said valve seat member when said pin lies in the foot of said L-shaped slot.

7. The valve of claim 1 wherein said rod has a threaded opening therein and a hand wheel is rotatably mounted upon said sleeve, a screw connected to rotate with said hand wheel so that when said screw is engaged in said threaded opening and said hand wheel is rotated with respect to said sleeve, said rod is axially moved.

8. The valve of claim 7 wherein said hand wheel is mounted upon a shaft and said screw thread is irrotatably and slidably mounted upon said shaft, a stop on said shaft to prevent said screw from sliding off said shaft, said shaft being slidable axially of said sleeve to permit engagement of said screw with said threaded opening in said rod.

9. The valve of claim 8 wherein a cylinder is mounted on said sleeve and a piston is mounted on said cylinder, said piston being secured to said rod, pressure fluid connection means to said cylinder so that upon introduction of fluid under pressure to said connection means, said piston moves in said cylinder and said screw slides up said shaft so that said hand wheel and said piston rod are selectively operable.

References Cited

UNITED STATES PATENTS

| | | | |
|---|---|---|---|
| 363,763 | 5/1887 | Puffer | 251—144 X |
| 2,530,433 | 11/1950 | Jaegle | 251—144 X |
| 3,103,341 | 9/1963 | Moran | 251—144 X |

FOREIGN PATENTS 1,179,598  12/1958  France.

ARNOLD ROSENTHAL, *Primary Examiner.*

U.S. Cl. X.R.

251—58, 144, 77